(No Model.)
W. E. CASE.
GALVANIC CELL.
No. 368,191.  Patented Aug. 16, 1887.
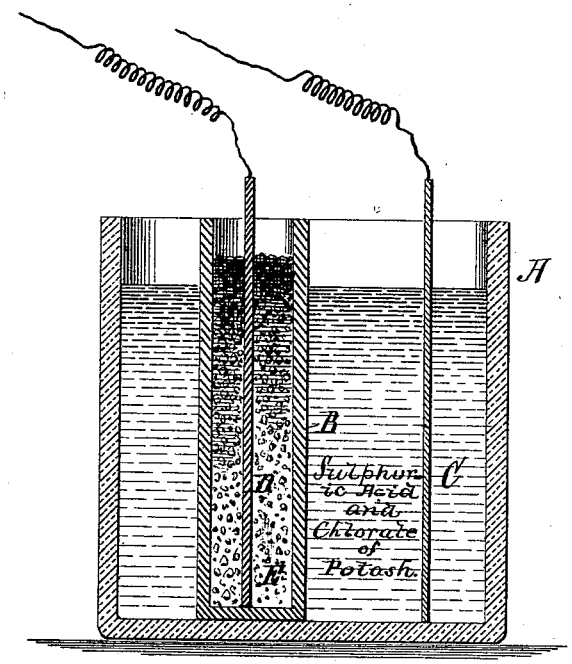
WITNESSES:
Gustave Dieterich
Edgar Goodwin
INVENTOR
Willard E. Case
BY Park Benjamin,
his ATTORNEY

UNITED STATES PATENT OFFICE.

WILLARD E. CASE, OF AUBURN, NEW YORK.

GALVANIC CELL.

SPECIFICATION forming part of Letters Patent No. 368,191, dated August 16, 1887.

Application filed April 20, 1887. Serial No. 235,468. (No model.)

*To all whom it may concern:*

Be it known that I, WILLARD E. CASE, of Auburn, Cayuga county, New York, have invented a new and useful Improvement in Galvanic Cells, of which the following is a specification.

My invention consists in a galvanic cell wherein carbon, forming the positive element, is chemically attacked without the application of heat. My said cell is a practical and operative apparatus for carrying into useful effect the improvement in the art of converting chemical energy into electrical energy which forms the subject-matter of another application for Letters Patent filed simultaneously herewith by me and serially numbered 235,466.

In the accompanying drawing is represented a vertical section of a convenient form of my said cell; but I do not limit myself to the precise construction and arrangement of parts here shown, because the same may be modified in various ways known to electrical workmen and others skilled in the art.

By the term "positive element," as everywhere herein used, I mean that one of two conducting bodies in a cell which is chemically attacked in said cell in greater degree than the other body, and whereof the consumption bears a relation to the electrical energy developed in the circuit. Other terms in common use for said positive element are "soluble element," "generating element," or that body whence the current apparently flows in the cell and to which the current apparently flows in the external surface.

In the term "carbon," as everywhere herein used, I include, first, native free carbon in all its forms in which it is a conductor of electricity; second, free carbon reduced from the various carbonaceous or carboniferous compounds which may be decomposed to afford free carbon, and, third, carbon compounds which are reducible to afford free carbon.

A is a containing-vessel, of glass or any other suitable material not attacked by acids.

B is a porous cup, of earthenware, for example, therein.

C is an element, preferably of sheet-platinum or other substantially unoxidizable material other than carbon.

D is a conducting-body of carbon, preferably any form of hard carbon—such as coke or gas-retort incrustation. In the porous cup is placed a quantity of carbon, E, in comminuted form, preferably previously moistened with sulphuric acid. The carbon in said porous cup constitutes the positive element, which is connected in circuit externally in the usual way with the negative or platinum element. In the outer vessel, A, is placed sulphuric acid. A cell thus arranged will give substantially no current, inasmuch as both elements resist the action of the acid. To said acid, however, I add chlorate of potash gradually in small quantities. The result of the reaction of the sulphuric acid and chlorate of potash is the formation (among other things) of peroxide of chlorine, which is a yellowish-red gas, and which permeates the liquid, gradually turning it to a red color. For practical purposes it is sufficient to cease adding chlorate of potash when the acid turns a distinct red. A reaction between the carbon and the peroxide of chlorine will, however, begin as soon as the peroxide permeates the porous cell and reaches the carbon, and if the addition of chlorate be suspended this reaction will continue until the acid loses its red hue, when probably the chemical affinities between the peroxide present and the carbon are satisfied. More chlorate may then be added.

Peroxide of chlorine is a very unstable oxygen compound, decomposing under the action of sunlight and at a temperature of 140° Fahrenheit. I have shown the cell here as uncovered; but in practice it is better to cover it, so as to prevent escape of gas. So, also, it is preferable to make the outer vessel of opaque material, and particularly of dark-colored glass, so as to cut off the light-rays while allowing inspection of the liquid.

The peroxide of chlorine formed as described apparently decomposes into chlorine and oxygen. The oxygen attacks the carbon, producing apparently carbonic acid. The other products of the reaction of the chlorate of potash and sulphuric acid are seemingly inert in the cell.

A certain amount of polarization occurs, which may be reduced by agitating the liquid or otherwise mechanically removing the gas, or by chemical means which I do not here describe, inasmuch as I propose to make the same the subject-matter of another application for Letters Patent hereafter to be filed.

It will be noted that I do not apply heat to said cell or to anything therein contained. I disclaim any and all forms of cell wherein the carbon is raised in temperature by the extraneous application of heat in order to augment its affinity for oxygen.

The presence of the porous cup is not in anywise essential to the operation of my cell; but it is preferably used because it retards the access of the peroxide of chlorine to the carbon, and so diminishes the rapidity of attack upon said carbon. So, also, the reduction of the carbon to comminuted form is not material, but preferable, in order to allow of ready permeation of the mass by the peroxide. I have made and successfully used cells wherein the carbon was in the form of a solid body placed directly in the electrolyte without intervention of any porous partition.

In another application for Letters Patent simultaneously herewith filed by me, Serial No. 235,467, I have described and claimed another form of my cell in which peroxide of chlorine in gaseous form generated outside the cell is conducted to the carbon. This specific invention I also herein disclaim.

I claim—

1. In a galvanic cell, a positive element of carbon and an electrolyte in which by the exercise of the chemical affinity of its constituents is formed a gas containing oxygen in unstable combination and capable of reacting on said carbon without the application of heat, substantially as described.

2. In a galvanic cell, a positive element of carbon and an electrolyte in which by the exercise of the chemical affinity of its constituents peroxide of chlorine is formed, substantially as described.

3. In a galvanic cell, in combination with an electrolyte containing peroxide of chlorine, a positive element of carbon, substantially as described.

4. In a galvanic cell, a positive element of carbon and an electrolyte of sulphuric acid containing peroxide of chlorine, substantially as described.

5. In a galvanic cell, in combination with an electrolyte containing peroxide of chlorine, a positive element of carbon and a negative element of platinum, substantially as described.

6. In a galvanic cell, an outer vessel, an electrolyte therein containing peroxide of chlorine, a conducting-body in said electrolyte, a porous inner vessel, and a body of carbon in comminuted form in said porous vessel, substantially as described.

7. The process of oxidizing an element of carbon in a galvanic cell, and thereby producing an electric current in a circuit including the electrolyte and other elements of said cell, which consists in adding chlorate of potash to sulphuric acid in said cell, in which acid said elements are immersed, and thereby forming peroxide of chlorine in the presence of said carbon, substantially as described.

WILLARD E. CASE.

Witnesses:
GEORGE UNDERWOOD,
FREDERICK I. ALLEN.